US011110834B1

(12) United States Patent
Ketels et al.

(10) Patent No.: US 11,110,834 B1
(45) Date of Patent: Sep. 7, 2021

(54) OCCUPANT SUPPORT CUSHION

(71) Applicant: Faurecia Automotive Seating, LLC, Auburn Hills, MI (US)

(72) Inventors: Cedric Ketels, Auburn Hills, MI (US); Davide Di Censo, Sunnyvale, CA (US); Thomas Dessapt, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/874,129

(22) Filed: May 14, 2020

(51) Int. Cl.
*A47C 31/00* (2006.01)
*B60N 2/56* (2006.01)
*B60N 2/90* (2018.01)

(52) U.S. Cl.
CPC ......... *B60N 2/5685* (2013.01); *B60N 2/5621* (2013.01); *B60N 2/90* (2018.02); *B60N 2/976* (2018.02)

(58) Field of Classification Search
CPC .... A61H 2201/0138; A61H 2201/0207; A61H 2201/0228; A61H 2201/0142; A61H 2201/0149; A61H 2201/10; A61H 2201/5007; A61H 2205/081; A47C 20/027; A47C 21/048; A47C 7/425; B60N 2/976
USPC ..................................................... 297/180.12
See application file for complete search history.

(56) References Cited

U.S. PATENT DOCUMENTS

| | | | | |
|---|---|---|---|---|
| 4,136,685 A * | 1/1979 | Ramey | | 5/915 |
| 4,607,624 A * | 8/1986 | Jefferson | | A61H 23/02 219/217 |
| 5,429,585 A * | 7/1995 | Liang | | A61H 23/0263 600/9 |
| 5,469,592 A * | 11/1995 | Johnson | | A47C 27/18 5/654 |
| 6,030,046 A * | 2/2000 | Dorow | | B60N 2/2821 297/216.11 |
| 6,082,819 A * | 7/2000 | Jackson | | B60N 2/2821 297/250.1 |
| 6,325,454 B1 * | 12/2001 | Maier | | B60N 2/2821 297/253 |
| 6,681,969 B1 * | 1/2004 | Giedeman, III | | B60R 7/043 224/275 |
| 6,799,799 B2 * | 10/2004 | Maier | | B60N 2/2821 297/253 |
| 6,814,709 B2 * | 11/2004 | Schwartz | | A47C 7/725 5/633 |
| 6,860,565 B2 * | 3/2005 | Spence, Jr. | | A47C 31/00 16/DIG. 24 |
| 6,928,829 B2 * | 8/2005 | Kamiya | | B60N 2/0244 297/452.42 |
| 7,037,278 B2 * | 5/2006 | Dabir | | A61H 7/001 297/452.45 |
| 7,287,812 B2 * | 10/2007 | Ishima | | B60N 2/5635 297/180.14 |
| 7,477,969 B2 * | 1/2009 | Panic | | B60N 2/0244 219/217 |

(Continued)

FOREIGN PATENT DOCUMENTS

CN 206587146 U 10/2017
EP 1608533 B1 12/2005

*Primary Examiner* — Shin H Kim

(74) *Attorney, Agent, or Firm* — Barnes & Thornburg LLP

(57) ABSTRACT

An occupant support includes a seat bottom and a seat back coupled to the seat bottom. An occupant support cushion is coupled to at least one of the seat bottom and the seat back.

20 Claims, 4 Drawing Sheets

(56) References Cited

U.S. PATENT DOCUMENTS

| | | | |
|---|---|---|---|
| 7,540,562 B2 | 6/2009 | Sekida | |
| 7,578,560 B2 * | 8/2009 | Spence, Jr. | A47C 31/00 |
| | | | 297/463.1 |
| 8,240,761 B2 * | 8/2012 | Clement | B60N 2/2893 |
| | | | 297/253 |
| 9,272,647 B2 * | 3/2016 | Gawade | B60N 2/5678 |
| 9,629,469 B1 * | 4/2017 | Watkins | F04B 35/04 |
| 9,756,956 B1 * | 9/2017 | Pekkinen | A47C 27/18 |
| 9,987,961 B2 | 6/2018 | Zouzal | |
| 10,532,674 B2 | 1/2020 | Wright | |
| 2002/0096931 A1 * | 7/2002 | White | B60N 2/5657 |
| | | | 297/452.42 |
| 2004/0004387 A1 * | 1/2004 | Spence | B60N 2/20 |
| | | | 297/463.1 |
| 2005/0093346 A1 * | 5/2005 | Witchie | B60N 2/5657 |
| | | | 297/180.1 |
| 2005/0184565 A1 * | 8/2005 | Weiss | B60N 2/5635 |
| | | | 297/180.15 |
| 2005/0280294 A1 * | 12/2005 | Ishima | B60N 2/5635 |
| | | | 297/180.1 |
| 2006/0244289 A1 * | 11/2006 | Bedro | B60N 2/5621 |
| | | | 297/180.1 |
| 2015/0048658 A1 * | 2/2015 | Gawade | B60N 2/5678 |
| | | | 297/180.12 |
| 2015/0359342 A1 * | 12/2015 | Vanderhorst | A47C 7/46 |
| | | | 297/180.12 |
| 2016/0068089 A1 * | 3/2016 | Huebner | B60N 2/6063 |
| | | | 297/228.13 |
| 2016/0144751 A1 * | 5/2016 | Asaeda | B60N 2/58 |
| | | | 297/253 |
| 2019/0038147 A1 | 2/2019 | Perraut | |
| 2020/0376922 A1 * | 12/2020 | Bhandari | B60H 1/00285 |
| 2020/0406797 A1 * | 12/2020 | Greenwood | B60N 2/5642 |
| 2021/0031926 A1 * | 2/2021 | Udriste | B64D 11/0626 |

\* cited by examiner

OCCUPANT SUPPORT CUSHION

BACKGROUND

The present disclosure relates to occupant supports in a vehicle. More particularly, the present disclosure relates to an occupant support with a lumbar support.

SUMMARY

According to the present disclosure, an occupant support for use in a vehicle includes a seat bottom and a seat back arranged to extend upwardly away from the seat bottom. The seat bottom and the seat back cooperate to define a seat bite region between the seat bottom and the seat back.

In illustrative embodiments, the occupant support further includes a removable occupant-support cushion that attaches to the occupant support by at least partially extending into the seat bite region. In some embodiments, the removable occupant-support cushion may extend all the way through the seat bite region of the occupant support to attach the removable occupant-support cushion to the occupant support.

In illustrative embodiments, the removable occupant-support cushion includes a cushion body, a cushion foundation, and an electronics system. The cushion body provides a lumbar support having a forward surface that engages the occupant and a rearward surface opposite the forward surface that engages the occupant support. The cushion foundation is arranged to extend away from the rearward surface toward the occupant support. At least a portion of the cushion foundation extends into the seat bite region to mount the removable occupant-support cushion to the occupant support. The electronics system is configured to provide various comfort effects for the occupant being supported by the cushion body.

In illustrative embodiments, the removable occupant-support cushion is configured to be attached to occupant supports using latches that are integrated into the occupant supports and arranged in the seat bite region. The cushion foundation includes a foundation insert that is inserted between the seat bottom and the seat back into the seat bite region. The cushion foundation may further include a foundation mount that is secured to the latches on the occupant support. In some embodiments, the foundation mount may extend all the way through the seat bite region of the occupant support 10 and be rotatable relative to the foundation insert from a freed position to a locked position.

In illustrative embodiments, the electronics system is arranged within an internal space of the cushion body and is configured to provide the various comfort effects through the cushion body to the occupant resting on the forward surface. The electronics system includes a plurality of comfort devices, a power system, a control unit, and an optional communication system. The plurality of comfort devices are arranged within the cushion body and are configured to provide the various comfort effects depending on the types of comfort devices included in the removable occupant-support cushion. The power system is coupled to each of the plurality of comfort devices to supply power to each so that they may operate and provide the comfort effects when desired by the occupant. The control unit is configured to output control signals to operate each of the plurality of comfort devices in response to user inputs. The communication system is coupled to the control unit and is configured to receive user inputs from a control device to cause the control unit to operate one or more of the plurality of comfort devices in response to the user inputs.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
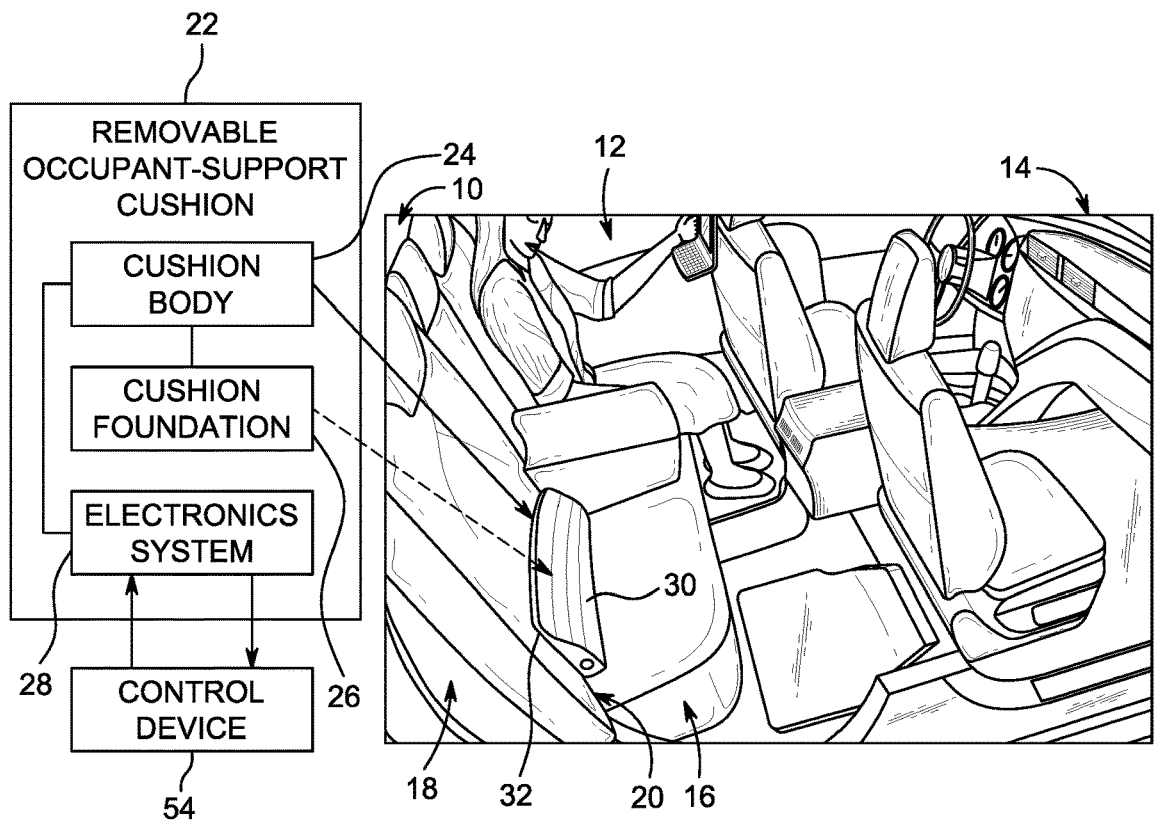
FIG. 1 is a perspective and diagrammatic view of a plurality of occupant supports within a cabin of a vehicle and showing a removable occupant-support cushion in accordance with the present disclosure attached to one of the plurality of occupant supports and that the removable occupant-support cushion includes a cushion body, a cushion foundation that mounts the cushion body to the occupant support, and an electronics system arranged within the cushion body to provide various comfort functions for an occupant being supported by the cushion body.
Figure 2:
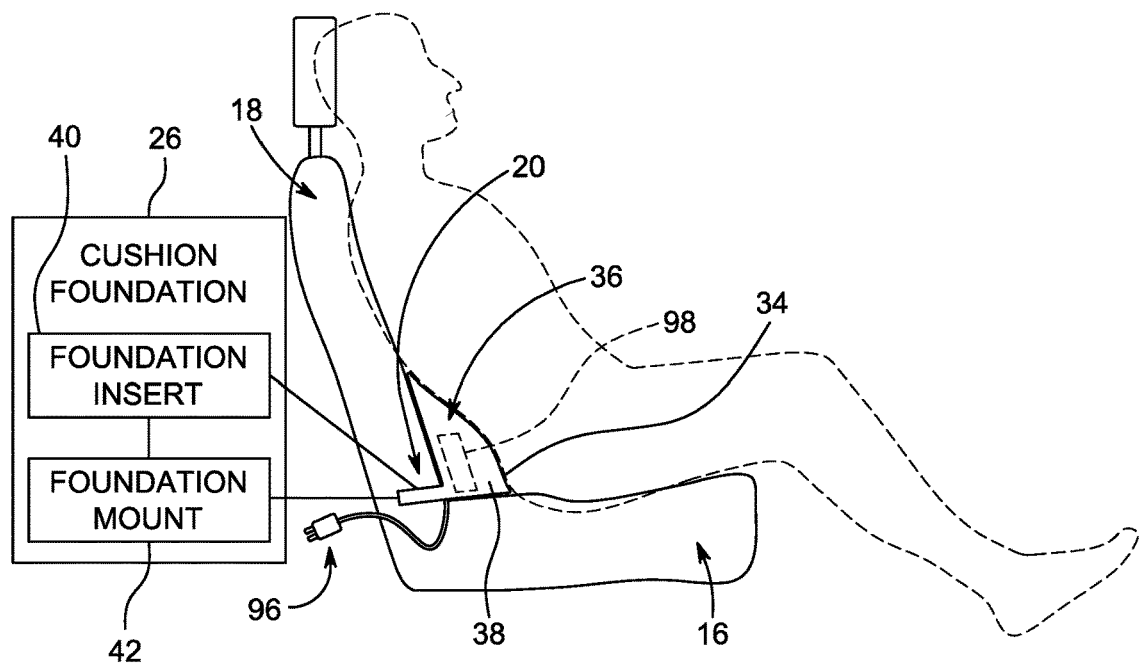
FIG. 2 is a side diagrammatic view of the occupant support including the removable occupant-support cushion from FIG. 1 and an outline of an occupant resting on the occupant support showing that the removable occupant-support cushion is a lumbar support and the cushion foundation includes a foundation insert that extends into a seat bite region of the occupant support and a foundation mount that is configured to secure the lumbar support to occupant support.
Figure 6:
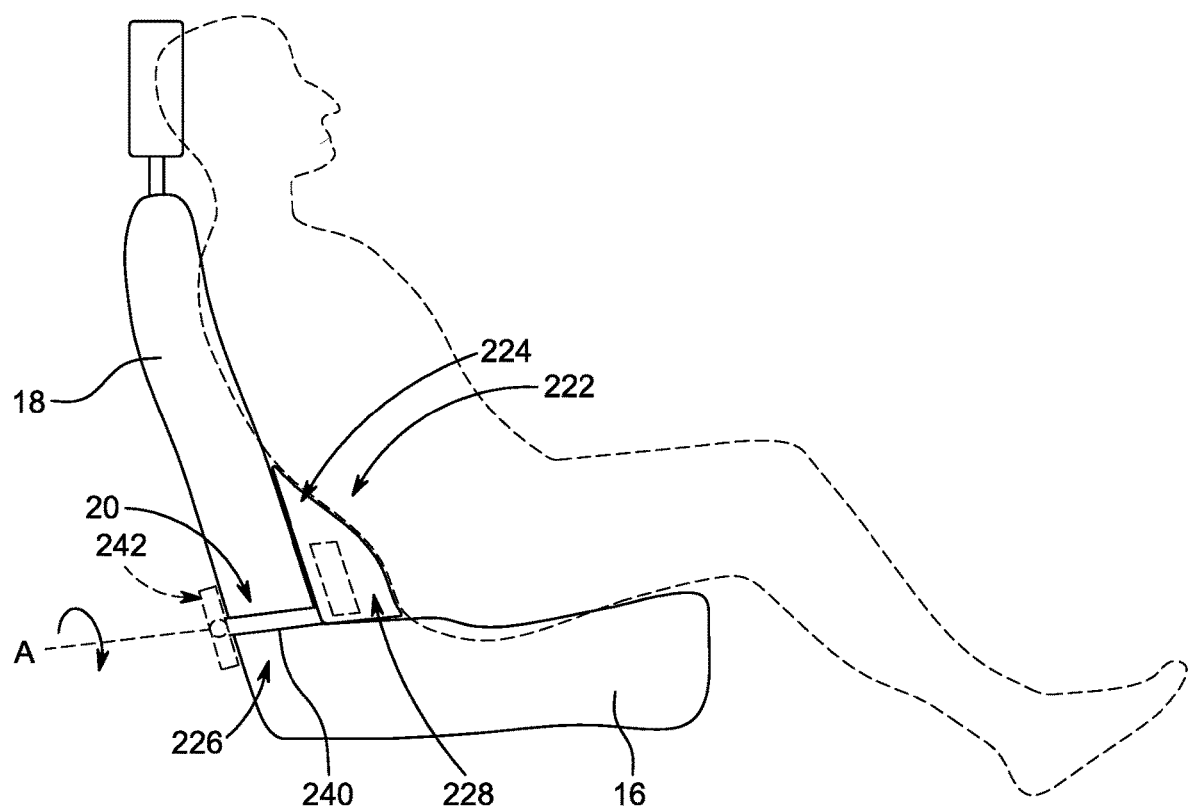
FIG. 6 is a side diagrammatic view of an occupant support with another embodiment of a removable occupant-support cushion attached thereto and showing that a portion of the occupant-support cushion extends all the way through the seat bite region of the occupant support to couple the removable occupant-support cushion to the occupant support.

A plurality of occupant supports 10 are arranged within a cabin 12 of a vehicle 14 as shown in FIG. 1. Each occupant support 10 in accordance with the present disclosure includes a seat bottom 16 and a seat back 18 arranged to extend upwardly away from the seat bottom 16. A seat bite region 20 is provided between the seat bottom 16 and the seat back 18 where the seat bottom 16 and the seat back 18 meet. Each occupant support 10 may further include a removable occupant-support cushion 22 that attaches to the occupant support 10 by at least partially extending into the seat bite region 20 as shown in FIG. 2. The removable occupant-support cushion 22 is configured to maximize comfort to the occupant, for example, when the occupant is a passenger in a vehicle used as a ride-share, taxi, or other suitable situation. Another embodiment of a removable occupant-support cushion 222 is shown in FIG. 6 that attaches to the occupant support 10 by extending all the way through the seat bite region 20 of the occupant support 10.

The removable occupant-support cushion 22 is configured to increase lumbar support for an occupant seated on the occupant support 10. The removable occupant-support cushion includes a cushion body 24, a cushion foundation 26, and an electronics system 28 as shown in FIG. 1. The cushion body 24 provides a lumbar support having a forward surface 30 that engages the occupant and a rearward surface 32 opposite the forward surface 30 that engages the occupant support 10. The forward surface 30 of the cushion body 24 has a convex shape that pushes a lumbar region of the occupant outward away from the seat back 18 for a more ergonomic overall shape of the occupant support 10. The cushion foundation 26 is arranged to extend away from the rearward surface 32 toward the occupant support 10. At least a portion of the cushion foundation 26 extends into the seat bite region 20 to mount the removable occupant-support cushion 22 to the occupant support 10. The electronics system 28 is configured to provide various comfort effects for the occupant being supported by the cushion body 24.

The cushion body 24 includes an outer trim 34 that defines an interior space 36 and a foam pad 38 located in the interior space 36 as shown in FIG. 2. The outer trim 34 is arranged to extend around foam pad 38 to provide the forward and rearward surfaces 30, 32. The outer trim 34 may be made from a fabric, a synthetic or a natural leather, a perforated leather, or any other suitable material. The outer trim 34 may be formed by Cushion Carving Technology (CCT) to provide a desired overall shape of the removable occupant-support cushion to maximize lumbar support for the occupant. The foam pad 38 is arranged to line inner surfaces of the outer trim 34 to provide cushioning for an occupant supported by the removable occupant-support cushion 22.

Figure 3:
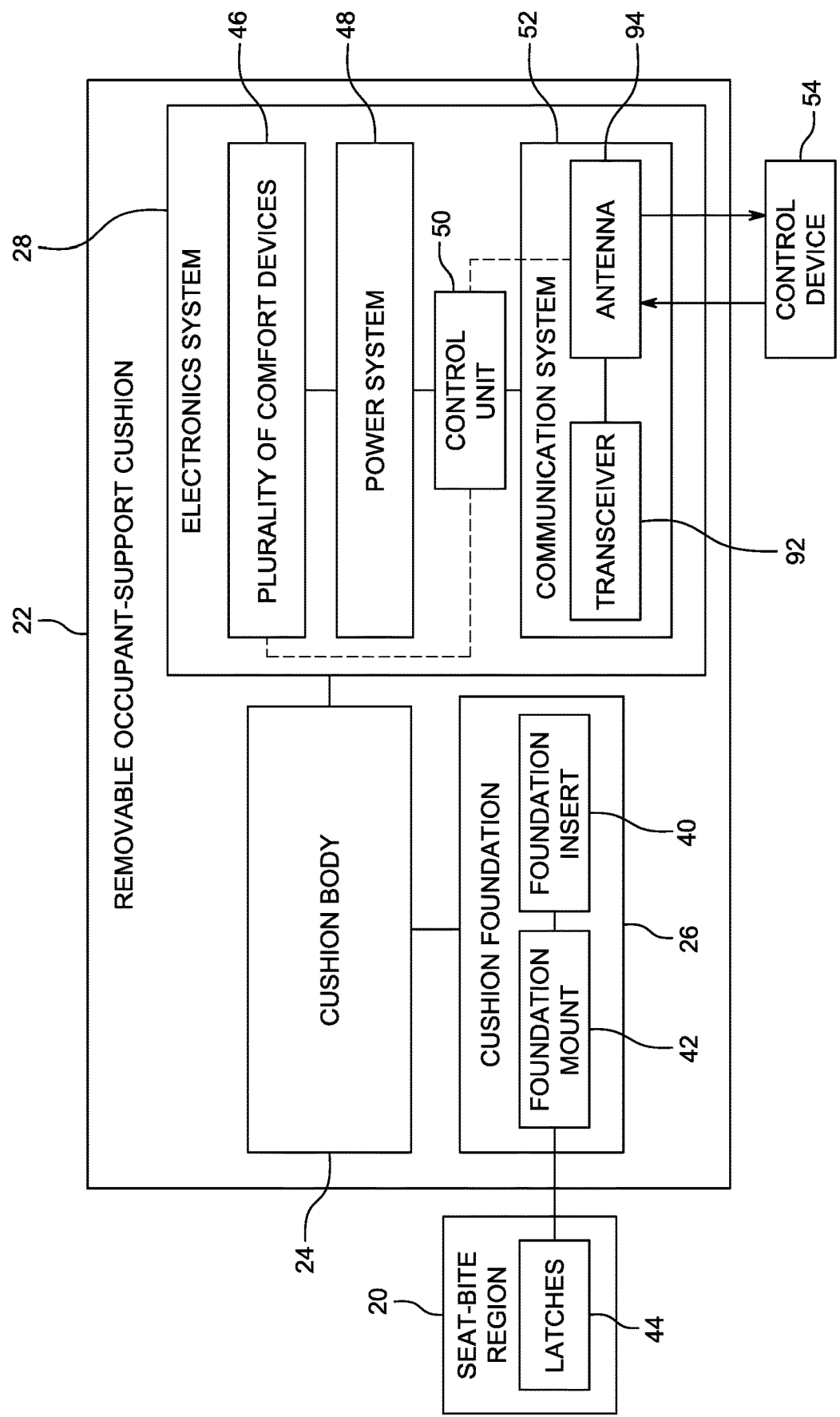
FIG. 3 is a diagrammatic view of the removable occupant-support cushion of FIGS. 1 and 2 showing that the electronics system includes a plurality of comfort devices, a power system that supplies power for each of the plurality of comfort devices, a control unit that operates each of the plurality of comfort devices, and a communication system that receives user inputs from a control device to cause the control unit to operate each of the plurality of comfort devices according to user preferences.

The removable occupant-support cushion 22 is configured to be attached, for example, to second row occupant supports 10 using latches 44 that are integrated into the second row occupant supports 10 and arranged in the seat bite region 20 as suggested in FIG. 3. In other examples, the removable occupant-support cushion 22 may be coupled to front row occupant supports. The cushion foundation 26 is configured to retain the removable occupant-support cushion 22 to the occupant support as shown in FIG. 2. The cushion foundation 26 includes a foundation insert 40 that is inserted between the seat bottom 16 and the seat back 18 into the seat bite region 20. The cushion foundation 26 may further include a foundation mount 42 that is secured to parts of the occupant support 10. The foundation mount 42 may include one or more hooks or clamps that attach to corresponding latch points 44 fixed to the occupant support 10 as suggested in FIG. 3. In another example, the foundation mount 42 may extend all the way through the seat bite region 20 of the occupant support 10 as shown in FIG. 6 and described in greater detail below.

Figure 4:
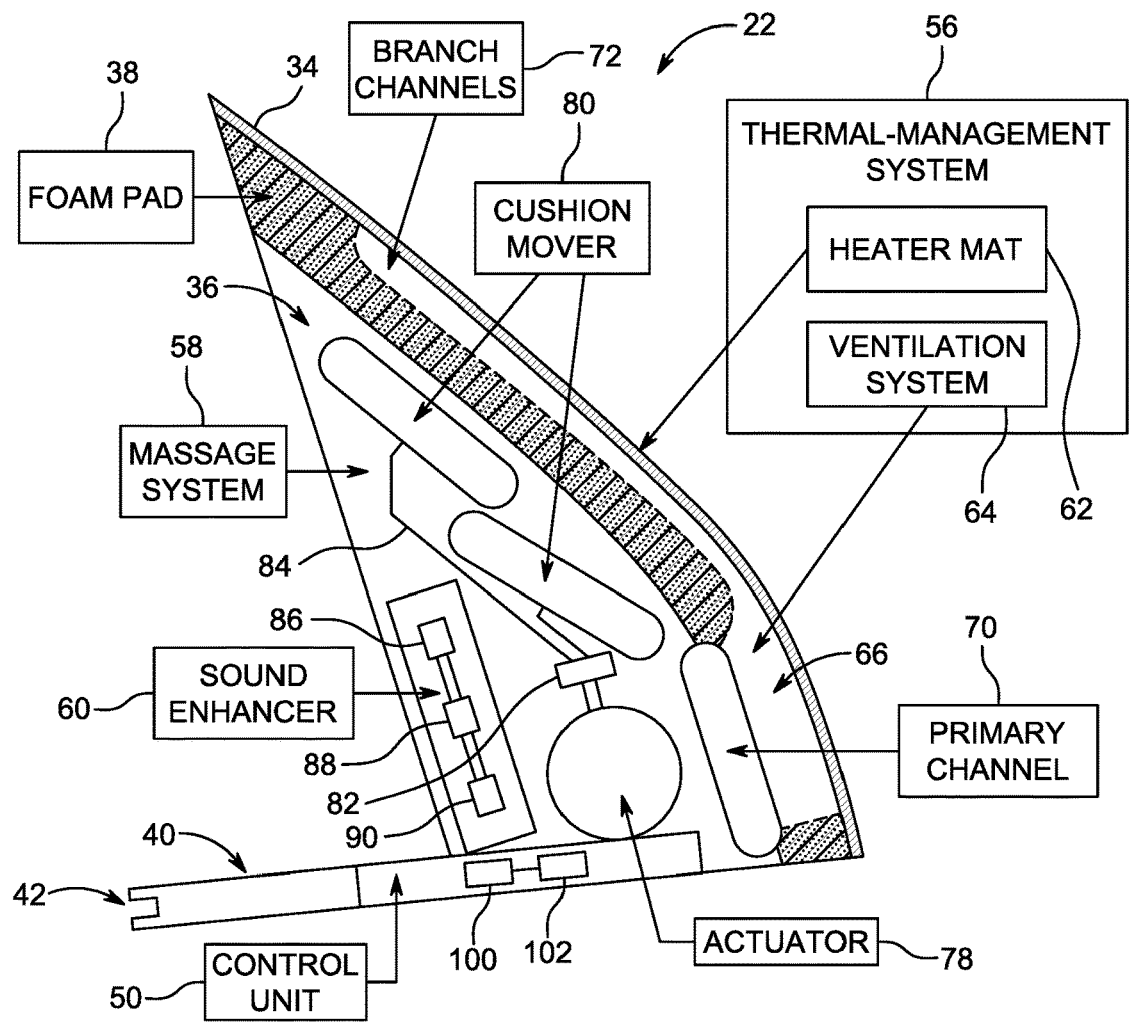
FIG. 4 is a side view of the removable occupant-support cushion showing diagrammatically the plurality of comfort devices arranged within the cushion body and showing that the plurality of comfort devices includes a thermal-management system, a massage system, and a sound enhancer.

The electronics system 28 is arranged, at least in part or completely, within the interior space 36 to provide the various comfort effects through the outer trim 34 to the occupant resting on the forward surface 30 as suggested in FIG. 2 and shown in FIG. 4. The electronics system 28 includes a plurality of comfort devices 46, a power system 48, a control unit 50, and an optional communication system 52 as shown in FIGS. 2 and 3. The plurality of comfort devices 46 are arranged within the cushion body 24 and are configured to provide the various comfort effects depending on the types of comfort devices 46 included in the removable occupant-support cushion 22. The power system 48 is coupled to each of the plurality of comfort devices 46 to supply power to each so that they may operate and provide the comfort effects when desired by the occupant. The control unit 50 is configured to output control signals to operate each of the plurality of comfort devices 46 in response to user inputs. The communication system 52 is coupled to the control unit 50 and is configured to receive user inputs from a control device 54 to cause the control unit 50 to operate one or more of the plurality of comfort devices 46 in response to the user inputs.

The plurality of comfort devices 46 includes, for example, a thermal-management system 56, a massage system 58, and a sound enhancer 60 as shown in FIG. 4. The thermal-management system 56 is configured to increase or decrease a temperature of the forward surface 30 of the cushion body 24. The massage system 58 is configured to move the forward surface 30 of the cushion body to massage parts of the occupant resting thereon. The sound enhancer 60 is configured to provide physical or audible effects through the cushion body 24.

The power system 48 is configured to supply power for each of the comfort devices 46 within the interior space 36 of the cushion body 24. The power system 48 includes an interface 96 and an optional battery 98 as shown in FIG. 2. The interface 96 is configured to couple to an electrical port (not shown) in the vehicle 14 or outside of the vehicle 14 when the removable occupant-support cushion 22 is removed from the vehicle 14. The interface 96 may be configured to connect with a 12-volt auxiliary power outlet (i.e. a car cigarette lighter) or with an AC power outlet. The battery 98 is arranged within the interior space 36 and is rechargeable so that the removable occupant-support cushion 22 does not need to be connected to a power outlet in the vehicle at all times. The battery 98 may be recharged outside of the vehicle 14 when the removable occupant-support cushion 22 is separated from the vehicle 14.

The control unit 50 provides functionality to control each of the comfort devices 46 in response to receipt signals from the communication system 52 indicative of user inputs into the control device 54. The control unit 50 includes a microprocessor 100 and memory storage device 102 storing instructions that, when executed by the microprocessor 100, cause the control unit 50 to output one or more control signals to at least one of the comfort devices 46 to operate the comfort devices 46 as selected by the occupant by the user inputs into the control device 54.

The control device 54 may be a remote control specifically designed to operate plurality of comfort devices 46 in the removable occupant-support cushion 22 or may be a separate wireless device such as a cell phone, tablet, laptop or another suitable control device. The control device 54 in the illustrative embodiment is connected to the communication system 52 by wireless means such as by Wi-Fi, Bluetooth, ultra-wideband (UWB), radio-frequency identification (RFID), or any other suitable wireless connection. In some embodiments, the control device 54 is directly connected to the control unit 50 by a wired connection and the communication system 52 may be omitted.

The communication system 52 is configured to relay signals between the control unit 50 and the control device 54 for two-way communication between the removable occupant-support cushion 22 and the control device 54. The communication system 52 includes a transceiver 92 and an antenna 94 as shown in FIG. 3. The transceiver 92 is coupled to the control unit 50 to communicate signals between the control unit 50 and the control device 54 using the antenna 94. The antenna 94 is coupled to the transceiver 92 and is configured to receive wireless signals from the control device 54 and transmit wireless signals to the control device 54 from the transceiver 92.

The control unit 50 may be programmed to output control signals only after validating that the user is authorized to use the plurality of comfort devices 46. The user may be required to input a user identifier into the control device 54 to validate that they are authorized to use the comfort devices 46. The user identifier is relayed to the control unit 50 and processed to determine whether the user is authorized to control one or more comfort devices 46. As an example, the user identifier may be associated with a precondition (i.e. payment). Upon receipt of the precondition, a signal is transmitted to the control unit 50 to allow the user to operate one or more of the comfort devices 46. A single precondition may be required to use all of the comfort devices 46 or multiple preconditions may be required if more than one comfort device is desired to be used. Other types of preconditions may be used to authorize control of the comfort devices 46 such as payment for a ride in the vehicle 14.

Figure 5:
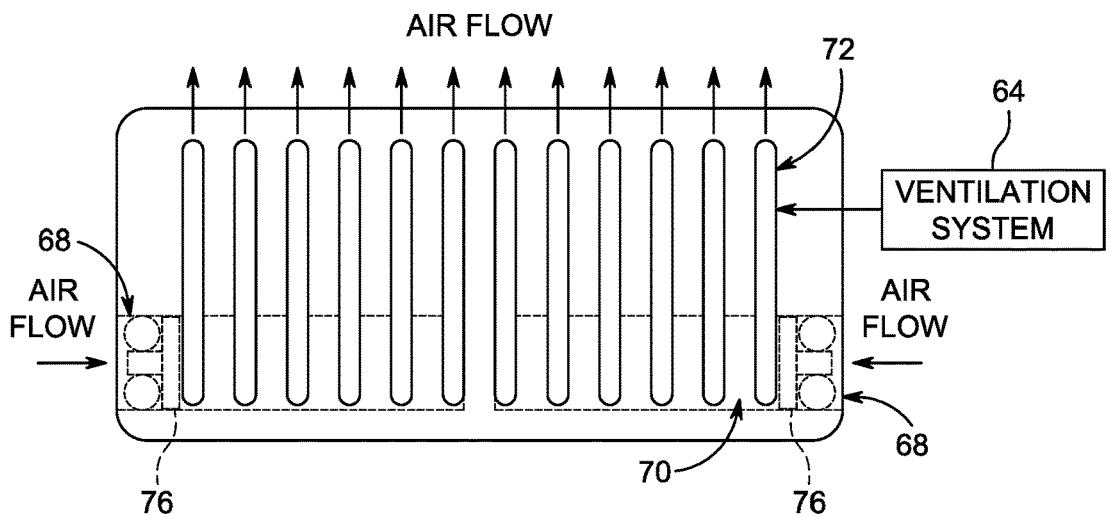
FIG. 5 is a front view of the removable occupant-support cushion showing that the thermal-management system includes a ventilation system having a plurality of channels formed in the cushion body, a pair of blowers that displace ambient air through the plurality of channels and showing that the ventilation system may further include one or more thermoelectric devices to condition a temperature of the air flowing through the plurality of channels.

The thermal-management system 56 includes a heater mat 62 that is arranged to extend along the forward surface 30 of the cushion body 24 and a ventilation system 64. The ventilation system may provide cooling through forward surface 30 as shown in FIGS. 4 and 5. The heater mat 62 is configured to provide heat through the forward surface 30 by conduction when the heater mat 62 is energized by the power system 48 or it may work in conjunction with the ventilation system 64 to heat air. In one example, the ventilation system 64 is configured to cool the forward surface by convection when the ventilation system is energized by the power system 48. In another example, the ventilation system 64 is configured to heat the occupant by convection when used in conjunction with the heater mater or some other source of heat.

The ventilation system 64 includes a plurality of channels 66 that extend through the cushion body 24 and at least one blower 68 as shown in FIG. 5. The plurality of channels 66 includes a primary channel 70 that extends horizontally through the cushion body 24 and a plurality of branch channels 72 that extend vertically through the cushion body 24 away from the primary channel 70. The primary channel 70 has a diameter that is greater than a diameter of each of the branch channels 72 to conduct a greater flow rate of fluid therethrough. The at least one blower 68 is arranged to lie within or adjacent to the primary channel 70 and is configured to displace ambient air into the primary channel 70. Each of the plurality of branch channels 72 extend from the primary channel 70 to receive the displaced air from the blower and direct the air to different areas of the cushion body 24 to maximize the cooling effect of the ventilation system 64 on the occupant. In some instances the blower 68 may displace air from each of the branch channels 72 to pull moisture and heat away from the outer trim 34 thereby providing cooling effects for the occupant.

The plurality of branch channels 72 are arranged to lie directly beneath the outer trim 34 and/or the heater mat 62 as shown in FIGS. 4 and 5. Each branch channel 72 is substantially straight and parallel with one another in the illustrative embodiment, although in other embodiments the branch channels may be curvilinear and non-parallel. The outer trim 34 and/or or the heater mat 62 may be formed to include perforations to allow air to flow from the cushion body 24 onto the occupant.

The ventilation system 64 may further include one or more thermo-electric devices (TED) 76 as shown in FIG. 5. The TED 76 are configured to generate heated or cooled airflow depending on the direction current is passed through the TEDs 76 using Peltier methods. The TEDs 76 are arranged adjacent to the blowers 68 to heat or cool the air being displaced by the blowers 68. When current is passed in a first direction, the TEDs 76 will provide heat to the air being displaced by the blowers 68 through the primary channel 70 to the branch channels 72. When current is passed in an opposite second direction, the TEDs 76 will remove heat from the air being displaced by the blowers 68 through the primary channel 70 to the branch channels 72.

The massage system 58 may be pneumatic or mechanical and includes an actuator 78 and a plurality of cushion movers 80 as shown in FIG. 4. The actuator 78 and the plurality of cushion movers 80 are arranged within the interior space 36. The actuator 78 is configured to actuate the cushion movers 80. The cushion movers 80 are actuated by the actuator 78 to move in a massage sequence that provides a massage effect on the occupant through the forward surface 30. The control unit 50 is configured to operate the actuator 78 to control the massage sequence. The control unit 50 may be preprogrammed with a plurality of difference massage sequences that provide different massage effects on the occupant through the forward surface 30. The occupant may input a selection into the control device to select a particular massage sequence desired and output by the massage system 58.

In the illustrative embodiment, the massage system 58 is a pneumatic system. The actuator 78 is a pneumatic pump while the plurality of cushion movers 80 are inflatable bladders. Although only two inflatable bladders are shown in FIG. 4, any number of inflatable bladders may be included in the interior space 36 to provide different massage sequences. The pneumatic pump is configured to displace a fluid toward and away from the inflatable bladders to cause the inflatable bladders to inflate and deflate to provide a selected massage sequence. The massage system 58 may further include a valve block 82 that controls passage of air through conduits 84 to control the inflation and deflation of each individual inflatable bladder. If the massage system 58 is mechanical, the cushion movers 80 may be movable components such as rollers that are moved or rotated within the interior space 36 to provide the massage sequence on the occupant through the forward surface 30.

The sound enhancer 60 includes a transducer 86, an amplifier 88, and a low pass filter 90 as shown in FIG. 4. The transducer 86 is arranged within the interior space 36 and is configured to provide the physical or audible effects through the cushion body 24 to enhance the occupant's overall sound experience within the vehicle 14. For example, the transducer 86 may be a subwoofer speaker that provides only low frequency vibrations and/or audible wavelengths. In another example, the transducer 86 may only provide vibrations through the cushion body 24 without providing any audible wavelengths. The transducer 86 is coupled to the amplifier 88 and the low pass filter 90. The amplifier 88 is configured to increase an electrical signal from a power source, such as power system 48 or a power source in vehicle 14, to power the transducer 86. The low pass filter 90 is configured to receive input signals containing a wide range of frequencies and attenuate the signals so that only a desired range of frequencies (i.e. low frequencies) is used by the transducer 86 and/or the amplifier 88. The low pass filter is optional such that the transducer may be configured to produce audible wavelengths of any and all frequencies. The amplifier 88 and the low pass filter 90 are shown as being contained within the interior space 36 with the transducer 86, but may be located outside of interior space 36 if a wired connection is made between the removable occupant-support cushion 22 and the vehicle 14.

Another example of a removable occupant-support cushion 222 is shown in FIG. 6. The removable occupant-support cushion 222 is substantially similar to removable occupant-support cushion 22 shown in FIGS. 1-5. Accordingly, similar reference numbers in the 200 series are used to describe features that are similar between removable occupant-support cushion 22 and removable occupant-support cushion 222. The disclosure of removable occupant-support cushion 22 above is hereby incorporated herein for removable occupant-support cushion 22 except for the differences between removable occupant-support cushion 22 and removable occupant-support cushion 222 described below.

The removable occupant-support cushion 222 includes a cushion body 224 a cushion foundation 226, and an electronics system 228 as shown in FIG. 6. The cushion body 224 and the electronics system 228 are substantially similar to cushion body 24 and electronics system 28 of removable occupant-support cushion 22. The cushion foundation 226 includes a foundation insert 240 that extends all the way through a seat bite region 20 between seat bottom 16 and seat back 18. The cushion foundation 226 further includes a foundation mount 242 that is movable relative to the foundation insert 240. The foundation mount 242 is rotatable about an axis A relative from a freed position to a locked position. In the freed position, the foundation mount 242 is generally parallel with the seat bite region 20 of the occupant support 10 so that the cushion foundation 226 may pass through the seat bite region 20 until the foundation mount 242 is arranged on a back side of the occupant support 10. The foundation mount 242 may then be rotated about axis A to the locked position to lie generally perpendicular to the seat bite region 20. The foundation insert 240 and the foundation mount 242 cooperate to provide a quarter-turn fastener that blocks separation of the removable occupant-support cushion 222 from the occupant support 10 when the foundation mount 242 is in the locked position as shown in FIG. 6.

In some embodiments, the removable occupant-support cushion 22, 222 improves user comfort and experience by providing a connected plug & play lumbar pillow. The removable occupant-support cushion 22, 222 addresses various pain points: postural comfort, thermal comfort, and back pain. The removable occupant-support cushion 22, 222 may also provide enhanced sound immersion.

In some embodiments, the removable occupant-support cushion 22, 222 is provided for second row comfort where occupant support functionality and comfort may be less than functionality and comfort of front row occupant supports. The removable occupant-support cushion 22, 222 may incorporate modular comfort, convenience and connectivity features. The system allows for on-demand massage, thermal comfort, enhanced audio features and more. The removable occupant-support cushion 22, 222 may deliver on-demand services that can provide ongoing new revenue streams. The removable occupant-support cushion 22, 222 may provide an add-on solution to any vehicle with modular features to maximize occupant comfort.

In some embodiments, the removable occupant-support cushion 22, 222 is shaped in a way to provide better ergonomic position in the rear row of any vehicle. The removable occupant-support cushion 22, 222 can be fixed to the occupant support through an insert sliding into the bite line for positioning and isofix attachment, using hooks or clamps method for fixation. The pillow's surface materials can include one or more of the following materials, including but not limited to: fabric, CCT, synthetic or natural leather, perforated leather, etc. Aside from such primary function, this system is comprised of multiple sub-systems that provide various comfort functions using comfort devices 46.

In some embodiments, the removable occupant-support cushion 22, 222 integrates thermal features to cool and heat the lower back of the passenger. For cooling, the surface of the pillow integrates grooves designed to conduct cool air (ventilation) between the pillow surface foam pad and the passenger. The ventilation air may be generated by a blower in the back or side of the pillow and channeled into the groves. Similarly, the pillow may implement a Peltier system with a fan that generates cold air instead of just ventilation. For heating, the surface of the cushion integrates a heating pad or mat to heat the passenger's back. The heating mat may act just as a radiant heat source or in association with the fan to push warm air to the passenger.

In some embodiments, the removable occupant-support cushion 22, 222 integrates bladders and/or mechanical massage rollers to provide massage on demand. In some embodiments, the removable occupant-support cushion 22, 222 also incorporates one or more transducers that can enhance the perception of bass in music that is being played in the cabin or passenger's headphones. These transducers may be connected to an amplification system and/or a low-pass filter to only maintain and reproduce low frequency spectrum of the music being played.

In some embodiments, the removable occupant-support cushion 22, 222 can be controlled remotely from a smartphone app or by a remote controller or directly by the in-vehicle-infotainment (IVI) system. An onboard communication system allows the passenger to control the removable occupant-support cushion 22, 222 functionalities via one or multiple communication methods: Bluetooth, BLE, wireless, Ethernet cable, USB, CAN/LIN bus, or other. Communication with the pillow can be used to start/stop functionalities.

In some embodiments, the removable occupant-support cushion 22, 222 can be connected to the vehicle's 12V power through the traditional cigarette lighter port or via a 120/240V plug. In another example, the pillow can integrate a rechargeable battery directly onboard.

The following numbered clauses include embodiments that are contemplated and non-limiting:

Clause 1. An occupant support comprising a seat bottom.

Clause 2. The occupant support of clause 1, any other clause, or any suitable combination of clauses, further comprising a seat back coupled to the seat bottom to provide a seat bite region between the seat bottom and the seat back.

Clause 3. The occupant support of clause 2, any other clause, or any suitable combination of clauses, a removable occupant-support cushion separate from both the seat bottom and the seat back.

Clause 4. The occupant support of clause 3, any other clause, or any suitable combination of clauses, wherein the removable occupant-support cushion includes a cushion body having a forward surface configured to engage a lumbar region of an occupant to increase support for the occupant and a rearward surface facing away from the forward surface and configured to engage at least one of the seat bottom and the seat back, a cushion foundation that extends away from the rearward surface of the cushion body into the seat bite region between the seat bottom and the seat back to couple the removable occupant-support cushion to the seat bottom and the seat back, and an electronics system including at least one comfort device arranged within the cushion body and configured to provide one or more functions to increase comfort for the occupant supported by the removable occupant-support cushion.

Clause 5. The occupant support of clause 4, any other clause, or any suitable combination of clauses, wherein the cushion foundation includes a foundation insert arranged to extend into the seat bite region between the seat bottom and the seat back and a foundation mount that is adapted to couple to a latch point that is fixed to at least one of the seat bottom and the seat back.

Clause 6. The occupant support of clause 4, any other clause, or any suitable combination of clauses, wherein the electronics system includes a plurality of comfort devices, a power system, and a communication system configured to receive user inputs from a control device to control operation of each of the comfort devices.

Clause 7. The occupant support of clause 6, any other clause, or any suitable combination of clauses, wherein the plurality of comfort devices includes a thermal-management system including a heater mat and a ventilation system.

Clause 8. The occupant support of clause 7, any other clause, or any suitable combination of clauses, wherein the heater mat is arranged to lie beneath the forward surface of the cushion body and is configured to provide conductive heat through the forward surface.

Clause 9. The occupant support of clause 7, any other clause, or any suitable combination of clauses, wherein the ventilation system includes a blower arranged within the cushion body and is configured to displace air through a plurality of channels formed through the cushion body.

Clause 10. The occupant support of clause 9, any other clause, or any suitable combination of clauses, wherein the plurality of channels includes a primary channel that contains the blower and extends in a first direction through the cushion body and a plurality of branch channels that extend through the cushion body in a second direction different than the first direction.

Clause 11. The occupant support of clause 4, any other clause, or any suitable combination of clauses, wherein thermal-management system includes a thermo-electric device (TED) that provides heat to the forward surface of the cushion body and removes heat to provide cool to the forward surface of the cushion body.

Clause 12. The occupant support of clause 7, any other clause, or any suitable combination of clauses, wherein the plurality of comfort devices further includes a massage system including an actuator and a plurality of cushion movers arranged within the cushion body and configured to move the forward surface to provide massage effects for an occupant supported thereon.

Clause 13. The occupant support of clause 12, any other clause, or any suitable combination of clauses, wherein the plurality of comfort devices further includes a transducer arranged within the cushion body and configured to provide physical or audible effects through the cushion body to the occupant supported thereon.

Clause 14. The occupant support of clause 4, any other clause, or any suitable combination of clauses, wherein the electronics system further comprises a control unit that is configured to output control signals to operate at least one of the comfort devices only after validating that the occupant is authorized to use the at least one comfort device.

Clause 15. A removable occupant-support cushion adapted to couple to an occupant support in a vehicle comprises a cushion body configured to engage a lumbar region of an occupant to increase support for the occupant.

Clause 16. The removable occupant-support cushion of clause 15, any other clause, or any suitable combination of clauses, further comprising a foundation mount configured to extend away from the cushion body and adapted to extend into a seat bite region at an interface between a seat bottom a the seat back of the occupant support to couple the removable lumbar cushion to the seat bottom and the seat back.

Clause 17. The removable occupant-support cushion of clause 16, any other clause, or any suitable combination of clauses, wherein the cushion foundation includes a foundation insert that is adapted to extend into the seat bite region and a foundation mount that is adapted to couple to a latch point.

Clause 18. The removable occupant-support cushion of clause 16, any other clause, or any suitable combination of clauses, wherein the cushion foundation includes a foundation insert that is adapted to extend all the way through the seat bite region and a foundation mount that is rotatable about an axis from a freed position in which the foundation mount is generally parallel with the axis to be inserted into the seat bite region and a locked position in which the foundation mount is arranged generally perpendicular to the axis.

Clause 19. The removable occupant-support cushion of clause 18, any other clause, or any suitable combination of clauses, further comprising an electronics system integrated into the cushion body and configured to provide one or more electric functions that increase comfort for the occupant supported by the removable lumbar cushion.

Clause 20. The removable occupant-support cushion of clause 19, any other clause, or any suitable combination of clauses, wherein the electronics system includes a plurality of comfort devices, a power system, and a communication system configured to receive user inputs from a control device to control operation of each of the comfort devices.

Clause 21. The removable occupant-support cushion of clause 20, any other clause, or any suitable combination of clauses, wherein the plurality of comfort devices includes a thermal-management system having a heater mat and a ventilation system, the heater mat being arranged to lie beneath the forward surface of the cushion body and being configured to provide conductive heat through the forward surface, the ventilation system including a blower arranged within the cushion body and being configured to displace air through a plurality of channels that extend through the cushion body.

Clause 22. The removable occupant-support cushion of clause 21, any other clause, or any suitable combination of clauses, wherein the plurality of channels includes a primary channel that contains the blower and extends in a first direction through the cushion body and a plurality of branch channels that extend through the cushion body in a second direction different than the first direction.

Clause 23. The removable occupant-support cushion of clause 20, any other clause, or any suitable combination of clauses, wherein the plurality of comfort devices further includes a massage system including an actuator and a plurality of cushion movers arranged within the cushion body and configured to move the forward surface to provide massage effects for an occupant supported thereon.

Clause 24. The removable occupant-support cushion of clause 23, any other clause, or any suitable combination of clauses, wherein the plurality of comfort devices further includes a transducer arranged within the cushion body and configured to provide physical or audible effects through the cushion body to the occupant supported thereon.

Clause 25. The removable occupant-support cushion of clause 18, any other clause, or any suitable combination of clauses, wherein the electronics system further comprises a control unit that is configured to output control signals to operate at least one of the comfort devices only after validating that the occupant is authorized to use the at least one comfort device.

The invention claimed is:

1. An occupant support comprising
a seat bottom,
a seat back coupled to the seat bottom to provide a seat bite region between the seat bottom and the seat back, and
a removable occupant-support cushion separate from both the seat bottom and the seat back,
wherein the removable occupant-support cushion includes a cushion body having a forward surface configured to engage a lumbar region of an occupant to increase support for the occupant and a rearward surface facing away from the forward surface and configured to engage at least one of the seat bottom and the seat back, a cushion foundation that extends away from the rearward surface of the cushion body into the seat bite region between the seat bottom and the seat back to couple the removable occupant-support cushion to the seat bottom and the seat back, and an electronics system including at least one comfort device arranged within the cushion body and configured to provide one or more functions to increase comfort for the occupant supported by the removable occupant-support cushion, and
wherein the electronics system further comprises a control unit that is configured to output control signals to operate at least one of the comfort devices in response to user inputs into a control device, the user inputs including a user identifier processed by the control unit to validate that the occupant is authorized to use the at least one comfort device.

2. The occupant support of claim 1, wherein the cushion foundation includes a foundation insert arranged to extend into the seat bite region between the seat bottom and the seat back and a foundation mount that is adapted to couple to a latch point that is fixed to at least one of the seat bottom and the seat back.

3. The occupant support of claim 1, wherein the electronics system includes a plurality of comfort devices, a power system, and a communication system configured to receive user inputs from a control device to control operation of each of the comfort devices.

4. The occupant support of claim 3, wherein the plurality of comfort devices includes a thermal-management system including a heater mat and a ventilation system.

5. The occupant support of claim 4, wherein the heater mat is arranged to lie beneath the forward surface of the cushion body and is configured to provide conductive heat through the forward surface.

6. The occupant support of claim 4, wherein the ventilation system includes a blower arranged within the cushion body and is configured to displace air through a plurality of channels formed through the cushion body.

7. The occupant support of claim 6, wherein the plurality of channels includes a primary channel that contains the blower and extends in a first direction through the cushion body and a plurality of branch channels that extend through the cushion body in a second direction different than the first direction.

8. The occupant support of claim 4, wherein thermal-management system includes a thermo-electric device (TED) that provides heat to the forward surface of the cushion body and removes heat to provide cool to the forward surface of the cushion body.

9. The occupant support of claim 4, wherein the plurality of comfort devices further includes a massage system including an actuator and a plurality of cushion movers arranged within the cushion body and configured to move the forward surface to provide massage effects for an occupant supported thereon.

10. The occupant support of claim 9, wherein the plurality of comfort devices further includes a transducer arranged within the cushion body and configured to provide physical or audible effects through the cushion body to the occupant supported thereon.

11. A removable occupant-support cushion adapted to couple to an occupant support in a vehicle comprising
a cushion body configured to engage a lumbar region of an occupant to increase support for the occupant, and
a cushion foundation configured to extend away from the cushion body and adapted to extend into a seat bite region at an interface between a seat bottom a the seat back of the occupant support to couple the removable lumbar cushion to the seat bottom and the seat back,
wherein the cushion foundation includes a foundation insert that is adapted to extend all the way through the seat bite region and a foundation mount that is rotatable about an axis from a freed position in which the foundation mount is generally parallel with the axis to be inserted into the seat bite region and a locked position in which the foundation mount is arranged generally perpendicular to the axis when viewed from a side of the cushion body.

12. The removable occupant-support cushion of claim 11, further comprising an electronics system integrated into the cushion body and configured to provide one or more electric functions that increase comfort for the occupant supported by the removable lumbar cushion.

13. The removable occupant-support cushion of claim 12, wherein
the electronics system includes a plurality of comfort devices, a power system, and a communication system configured to receive user inputs from a control device to control operation of each of the comfort devices.

14. The removable occupant-support cushion of claim 13, wherein the plurality of comfort devices includes a thermal-management system having a heater mat and a ventilation system, the heater mat being arranged to lie beneath the forward surface of the cushion body and being configured to provide conductive heat through the forward surface, the ventilation system including a blower arranged within the cushion body and being configured to displace air through a plurality of channels that extend through the cushion body.

15. The removable occupant-support cushion of claim 14, wherein the plurality of channels includes a primary channel that contains the blower and extends in a first direction through the cushion body and a plurality of branch channels that extend through the cushion body in a second direction different than the first direction.

16. The removable occupant-support cushion of claim 13, wherein the plurality of comfort devices further includes a massage system including an actuator and a plurality of cushion movers arranged within the cushion body and configured to move the forward surface to provide massage effects for an occupant supported thereon.

17. The removable occupant-support cushion of claim 16, wherein the plurality of comfort devices further includes a transducer arranged within the cushion body and configured to provide physical or audible effects through the cushion body to the occupant supported thereon.

18. The removable occupant-support cushion of claim 11, wherein the electronics system further comprises a control unit that is configured to output control signals to operate at least one of the comfort devices only after validating that the occupant is authorized to use the at least one comfort device.

19. A removable occupant-support cushion adapted to couple to an occupant support in a vehicle comprising
 a cushion body having a forward surface configured to engage a lumbar region of an occupant to increase support for the occupant and a rearward surface facing away from the forward surface,
 a cushion foundation that extends away from the rearward surface of the cushion body and is adapted to extend into a seat bite region of the occupant support between a seat bottom and a seat back of the occupant support to couple the removable occupant-support cushion to the seat bottom and the seat back, and
 an electronics system including at least one comfort device arranged within the cushion body and configured to provide one or more functions to increase comfort for the occupant supported by the removable occupant-support cushion,
wherein the electronics system further comprises a control unit that is configured to output control signals to operate the at least one comfort device in response to user inputs into a control device, the user inputs including a user identifier processed by the control unit to validate that the occupant is authorized to use the at least one comfort device.

20. The removable occupant-support cushion of claim 19, wherein the electronics system further includes:
 a thermal-management system having a heater mat arranged to extend along and inside surface of the cushion body adjacent to the forward surface and a ventilation system arranged to lie against the heater mat between the heater mat and the rearward surface, the ventilation system including a blower arranged within the cushion body and being configured to displace air through a plurality of channels that extend through the cushion body, wherein the plurality of channels includes a primary channel that contains the blower and that extends transversely through the cushion body from a first lateral side of the cushion body to a second lateral side of the cushion body and a plurality of branch channels that extend upwardly through the cushion body away from the primary channel, and
 a massage system including a pneumatic pump and a plurality of inflatable bladders arranged within the cushion body and located between the ventilation system and the rearward surface of the cushion body.

* * * * *